US007954786B2

(12) United States Patent
Narita et al.

(10) Patent No.: US 7,954,786 B2
(45) Date of Patent: Jun. 7, 2011

(54) SOLENOID VALVE ASSEMBLY (75) Inventors: Masaru Narita, Tsukubamirai (JP); Minehiko Mita, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 446 days.

(21) Appl. No.: 12/127,454

(22) Filed: May 27, 2008

(65) Prior Publication Data
US 2008/0308759 A1    Dec. 18, 2008

(30) Foreign Application Priority Data

Jun. 14, 2007 (JP) ................................. 2007-157424

(51) Int. Cl.
*F16K 31/02* (2006.01)
(52) U.S. Cl. ..................................... 251/129.15; 310/71
(58) Field of Classification Search ............. 251/129.15; 310/71, 14; 439/517, 696, 465, 467, 469, 439/687, 353, 357, 378, 76.1, 76.2
See application file for complete search history.

(56) References Cited

U.S. PATENT DOCUMENTS

| 4,915,654 | A | * | 4/1990 | Zinn ............................. 439/595 |
| 5,192,936 | A | * | 3/1993 | Neff et al. ...................... 335/281 |
| 5,383,795 | A | * | 1/1995 | Falossi et al. .................. 439/362 |
| 5,417,590 | A | * | 5/1995 | Dechelette et al. ......... 439/607.48 |
| 6,109,298 | A | * | 8/2000 | Kaneko et al. ................. 137/551 |
| 6,579,113 | B2 | * | 6/2003 | Kodama ......................... 439/358 |
| 6,748,976 | B2 | * | 6/2004 | Sato et al. .................. 137/625.65 |
| 6,772,791 | B2 | * | 8/2004 | Neff .......................... 137/625.65 |
| 6,840,273 | B2 | * | 1/2005 | Miyazoe et al. ............... 137/554 |
| 6,854,707 | B2 | | 2/2005 | Miyazoe |
| 6,959,910 | B2 | * | 11/2005 | Matsumoto et al. ...... 251/129.03 |
| 7,238,041 | B2 | * | 7/2007 | Katsuma ....................... 439/354 |
| D563,514 | S | * | 3/2008 | Mita et al. ..................... D23/233 |
| 2002/0137398 | A1 | * | 9/2002 | Miwa ........................... 439/701 |
| 2004/0051069 | A1 | * | 3/2004 | Miyazoe ................... 251/129.15 |
| 2004/0209527 | A1 | * | 10/2004 | Chen ............................. 439/852 |
| 2004/0222397 | A1 | * | 11/2004 | Hayashi ................... 251/129.09 |
| 2006/0108551 | A1 | * | 5/2006 | Yoshimura et al. ...... 251/129.15 |
| 2007/0178753 | A1 | | 8/2007 | Mita |

FOREIGN PATENT DOCUMENTS

| EP | 1 912 290 A1 | 4/2008 |
| JP | 1-115179 | 8/1989 |
| JP | 3-119678 | 12/1991 |
| JP | 2004-108446 | 4/2004 |
| JP | 2006-108053 | 4/2006 |
| JP | 2007-227354 | 9/2007 |
| WO | WO 2006/132195 A1 | 12/2006 |

* cited by examiner

*Primary Examiner* — John K Fristoe, Jr.
*Assistant Examiner* — Marina Tietjen
(74) *Attorney, Agent, or Firm* — Oblon, Spivak, McClelland, Maier & Neustadt, L.L.P.

(57) ABSTRACT

A socket housing formed on the side of a solenoid valve body includes a socket thereinside connected with a coil of a solenoid operation section. A power feeding terminal box for holding a pin-shaped power feeding terminal connected with a power feeding line is housed in a terminal cover. Installation of the terminal cover on the side of the solenoid valve body causes the power feeding terminal to be electrically connected with the socket and at the same time the power feeding terminal box to be locked into a locking stopper formed inside the terminal cover, thereby allowing the terminal cover to be locked and held in place.

16 Claims, 7 Drawing Sheets

FIG. 8

US 7,954,786 B2

SOLENOID VALVE ASSEMBLY

TECHNICAL FIELD

The present invention relates to a solenoid valve assembly having a passage switching section for switching a fluid passage, a solenoid operation section for operating the passage switching section, and a power feeding system for feeding the solenoid operation section with power.

BACKGROUND ART

The applicant has previously proposed a power feeding system for a solenoid valve assembly in Japanese patent application No. 2006-337528. The proposed solenoid valve assembly includes a solenoid valve body having a passage switching section and a solenoid operation section for operating the passage switching section, and a power feeding system for feeding the solenoid operation section with power, the power feeding system being provided with a printed circuit board inside a terminal cover mounted at the side of the solenoid valve body. Both of the front and back sides of the printed circuit board have a pin-shaped relay terminal to be inserted into a socket-shaped relay terminal electrically connected with the solenoid operation section, and pin-shaped power receiving terminals to be inserted into a power feeding socket mounted at the tip of a feeding line, the relay terminals and power receiving terminals feeding electrical power from the power feeding socket to the solenoid operation section therethrough.

Although the proposed solenoid valve assembly mentioned above assumes that the solenoid valve assembly is provided with the above-mentioned printed circuit board connected with electronic components having a surge protection circuit for controlling power feeding and a power saving circuit, and the like, there may be no need for the printed circuit board mentioned above if power feeding is controlled from external equipment. If so, a solenoid valve assembly equipped with no printed circuit board may be needed. If solenoid valve assemblies equipped with the printed circuit board are to be volume-produced as general-purpose items, it is desirable for solenoid valve assemblies with no printed circuit board to use the same solenoid valve body as those with the printed circuit board and to have a power feeding system of a modified design for the purposes of marketing solenoid valves at lower prices.

However, if the printed circuit board is omitted from the solenoid valve assembly, a modification must be made to the socket-shaped power feeding terminal at the tip of feeding lines to form a pin-shaped terminal so as to allow direct connection with the socket-shaped relay terminal mounted on the solenoid valve body for successful power feeding. In order to ensure safety, the power feeding system must be reconfigured, so as to avoid an exposure of the pin-shaped power feeding terminal to the outside of the assembly when it is unexpectedly disconnected from the relay terminal mounted on the solenoid valve body after they are connected to each other.

DISCLOSURE OF INVENTION

According to one aspect of the present invention, enhanced safety is provided by allowing the pin-shaped power feeding terminal connected with the feeding line to easily connect with the socket-shaped relay terminal mounted on the solenoid valve body as well as preventing the power feeding terminal from being unexpectedly disconnected from the socket-shaped relay terminal after they are connected to each other.

In order to solve the above-described problems, the solenoid valve of the present invention includes a solenoid valve body having a passage switching section for switching a fluid passage and a solenoid operation section for operating the passage switching section, and a power feeding system for the solenoid operation section mounted on the solenoid valve body. The solenoid valve body is provided at the side of the passage switching section thereof with socket housings which house sockets to be electrically connected with a coil inside the solenoid operation section. The power feeding system includes a terminal cover on the side of the solenoid valve body for covering the passage switching section and the solenoid operation section, and a power feeding terminal box for holding pin-shaped power feeding terminals connected with the tips of the power feeding lines. The terminal cover includes a terminal box housing for housing the power feeding terminal box at the position corresponding to the socket housing, and a locking stopper formed inside the terminal box housing and extending inwardly for locking the power feeding terminal box. The power feeding terminal box includes a terminal cover support for locking into the locking stopper. Placing the power feeding terminal box into the terminal box housing formed inside the terminal cover and mounting the terminal cover on the solenoid valve body cause the power feeding terminals to be electrically connected with the sockets as well as cause the terminal cover support to be locked into the locking stopper, thereby allowing the power feeding terminal box to be locked and held in place inside the terminal box housing.

Preferably, the socket housing is formed so as to stand from the side surface of the passage switching section and be held in close proximity to or in contact with the bottom of the power feeding terminal box, thereby allowing the power feeding terminal box to intervene between the socket housing and the locking stopper.

In the present invention, the power feeding terminal box includes a rectangular-box-shaped terminal housing box which is open at one side thereof, and a cover for covering the open side of the terminal housing box. The terminal housing box and the cover may be coupled together with the ends of the power feeding lines and the power feeding terminals being arranged therebetween, thereby allowing the power feeding terminal box and the power feeding terminals to be integrally assembled.

In this case, the terminal housing box and the cover are preferably coupled together by means of lock projections formed on one counterpart and lock holes formed on the other counterpart so as to mate with each other. More preferably, the cover has elastically deformable side walls at both side ends, the side walls having a plurality of lock holes. In addition, the terminal housing box is inserted between the side walls of the cover in a resilient manner so that a plurality of the lock projections formed at both sides of the terminal housing box are locked into the lock holes of the cover.

In the present invention, the terminal housing box includes concave-shaped terminal housing chambers for housing the power feeding terminals, the terminal housing chamber having an engaging projection at the center thereof. The power feeding terminal includes an engaging hole at a longitudinally intermediate position thereof. The power feeding terminal can be located inside the terminal housing box by engaging the engaging projection with the engaging hole.

Also, in the present invention, the terminal cover is preferably locked at its end on the solenoid operation section side to the solenoid valve body in such a manner that latch members formed on the terminal cover are engaged with latch holes formed on the solenoid valve body. In addition, the terminal cover is preferably secured at its end on the passage switching section side to the solenoid valve body by means of securing screws.

In the above-described solenoid valve assembly of the present invention, installation of the terminal cover which houses the power feeding terminal box into the solenoid valve body allows the pin-shaped power feeding terminals formed at the tip of the power feeding line to be easily connected with the sockets on the solenoid valve body. In addition, the power feeding terminal box is locked at the terminal cover support thereof to the locking stopper of the terminal cover so that the power feeding terminal box is locked and held in place inside the terminal cover, thereby preventing the power feeding terminal from becoming disconnected from the socket to avoid unexpected exposure of the power feeding terminal, resulting in enhanced safety.

BRIEF DESCRIPTION OF DRAWINGS

FIG. 6 is an exploded perspective view of the solenoid valve assembly, disassembled into the passage switching section, the solenoid operation section, the power feeding system, and the like.

FIG. 7 is a disassembled perspective view of the solenoid valve assembly, disassembled into the solenoid valve body, the power feeding system, and the like.

BEST MODE FOR CARRYING OUT THE INVENTION

Hereinafter, a preferred embodiment of the present invention will be explained with reference to FIGS. 1 through 8.

Figure 1:
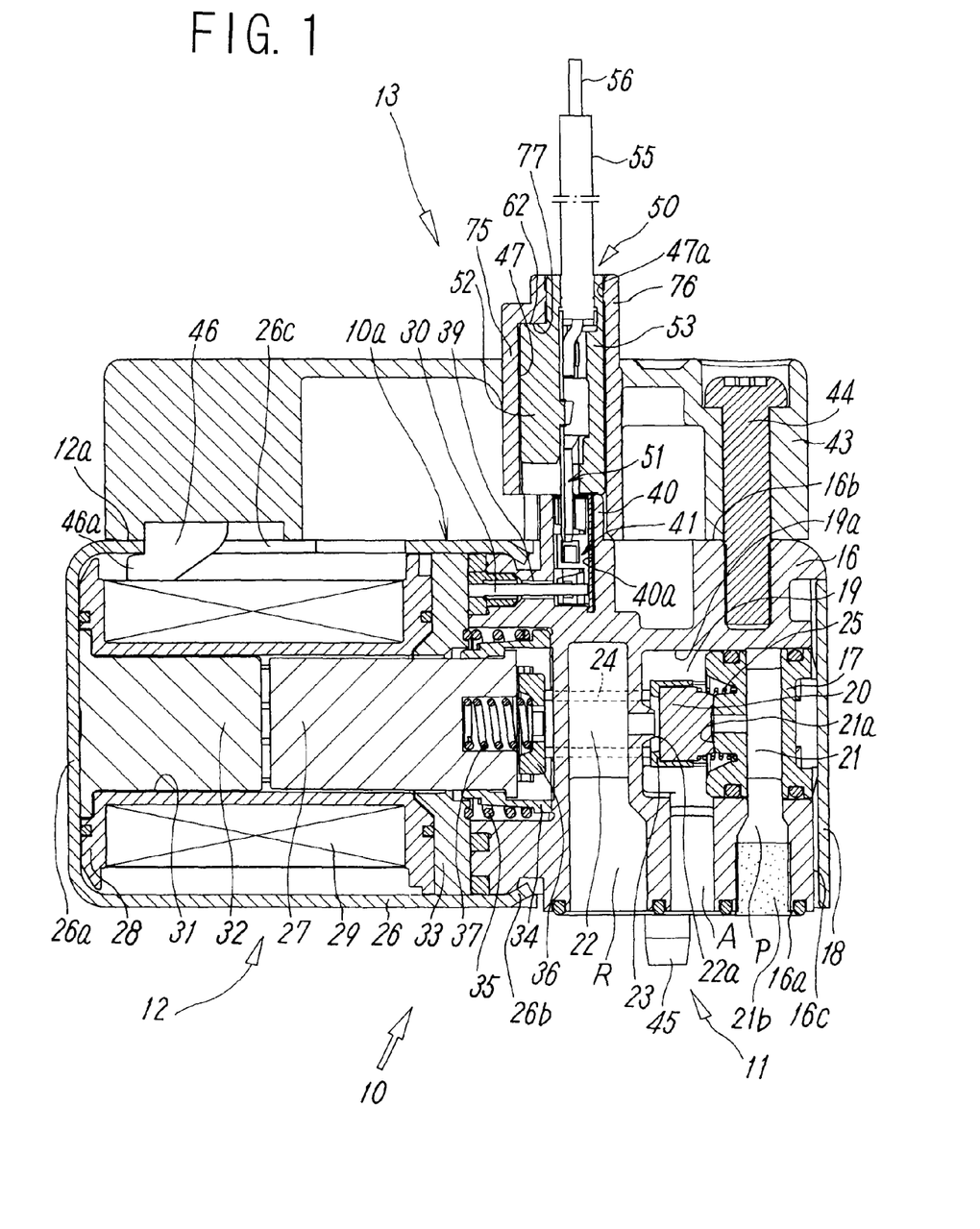
FIG. 1 is a longitudinal, sectional, side view showing an embodiment of the solenoid valve assembly of the present invention.

In FIG. 1, an embodiment of the solenoid valve assembly of the present invention may be roughly divided into a solenoid valve body 10 having a passage switching section 11 for switching a fluid passage as a three-port switching valve and a solenoid operation section 12 for operating the passage switching section 11, and a power feeding system 13 for feeding the solenoid operation section 12 with power. The solenoid valve body 10 is provided at the side of the passage switching section 11 with sockets electrically connected with the solenoid operation section 12. The power feeding system 13 includes the power feeding terminals 51 mounted on the tips of the power feeding lines 55 for connecting with the sockets 41, the power feeding terminal box 50 housing the power feeding terminals 51 therein, and the terminal cover 43 holding the power feeding terminal 51 and the power feeding terminal box 50 thereinside.

The passage switching section 11 has a substantially rectangular valve body 16 formed of electrically insulating synthetic resins, the valve body 16 being provided with a supply port P, an output port A, and a discharge port R which are open to a first side surface 16a. The valve body 16 is provided with a circular-section hole 19a for forming a valve chamber 19, the hole 19a facing toward the inside of the valve body 16 from the end face 16c opposing to the end face with which the solenoid operation section is coupled. The hole 19a has a valve seat block 17 installed thereon, the valve seat block 17 being secured to the inside of the hole 19a by means of a fixing plate 18 mounted on the end face 16c. The valve chamber 19 defined inside the hole 19a by the valve seat block 17 has a poppet valve disposed therein reciprocatably along the axial direction.

The valve seat block 17 has a supply side passage 21 formed therein allowing the supply port P to communicate with the valve chamber 19. Also, the valve body 16 has a discharge side passage 22 formed therein allowing the discharge port R to communicate with the valve chamber 19. The supply port P is provided with a filter 21b. A supply valve seat 21a around the opening of the supply side passage 21 is opposed to a discharge valve seat 22a around the opening of the discharge side passage 22 in the valve chamber 19, these valve seats having a valve 20 therebetween. The valve 20 is held by an annular valve holder 23. A plurality of push rods 24, an annular pressing member 36, and a pressing spring 37 are disposed between the valve holder 23 and a moving core 27 to be described later so as to be reciprocatable together with the moving core 27. The pressing spring 37 is set between the pressing member 36 and the bottom of a recessed hole formed in the moving core 27 and being open at one end, thereby allowing the movement of the moving core 27 to be transmitted to the valve 20 via the valve holder 23 having the pressing spring 37, the pressing member 36, and the push rod 24. A valve spring 25 is set between an annular groove around the supply valve seat 21a and the valve 20, the valve 20 being spring biased by the valve spring 25 against a discharge valve seat 22a. The output port A is normally formed so as to communicate with the valve chamber 19.

The magnet cover 26 of the solenoid operation section 12 being hollow and having a circular or oblong section with one end being open, houses an annular bobbin 28 which is wound with a coil 29. The coil 29 is connected at both ends thereof to a pair of coil terminals 30 which protrude in parallel to each other from the bobbin 28 and are inserted into a terminal accepting chamber 39 of the valve body 16. FIG. 1 shows the coil 29 connected at one end thereof to one of the coil terminal 30 where the other coil terminal and its associated power feeding components are not depicted. The inner aperture 31 inside the bobbin 28 has a fixed core 32 disposed so as to be in contact with an end wall 26a of the magnet cover 26 as well as the moving core 27 slidably disposed so as to be subject to magnetic attraction by the fixed core 32.

The magnet cover 26 includes a magnet plate 33 set therein between the bobbin 28 and the valve body 16. The magnet plate 33 is held in contact at its circumference with the inner surface of the magnet cover 26, thereby causing the magnet cover 26 to be magnetically coupled with the magnet plate 33. The inner aperture of the magnet plate 33 is substantially equal in diameter to the inner aperture 31 of the bobbin 28. The moving core 27 has an annular synthetic-resin cap 34 secured to the end thereof. A return spring 35 is set between the flange-shaped spring seat at the tip of the cap 34 and the annular groove of the magnet plate 33.

The passage switching section 11 and the solenoid operation section 12 are coupled with each other by crimping a lock tab 26b formed at the open end of the magnet cover 26 so as to be locked into the recess of the valve body 16.

FIG. 1 shows the coil 29 in the de-energized state. In this state, the return spring 35 having a stronger spring force than the valve spring 25 urges the moving core 27 against the valve body 16 by resisting the energizing force of the valve spring 25. This energizing force is transmitted to the valve 20 via the pressing spring 37, the pressing member 36, the push rod 24, and the valve holder 23, resulting in the valve 20 being released from the discharge valve seat 22a on the valve seat block 17 as well as being held in contact with the supply valve seat 21a. This disconnects the communication between the supply port A and the valve chamber 19 and creates communication between the output port A and the discharge port R.

Once energized, the coil 29 produces magnetic attraction between the fixed core 32 and the moving core 27 which causes the moving core 27 to be attracted by the fixed core 32, resulting in the valve 20 being released from the supply valve seat 21a and being held in contact with the discharge valve seat 22a. This disconnects the communication between the discharge port R and the valve chamber 19 and creates a communication between the supply port P and the output port A.

Figure 5:
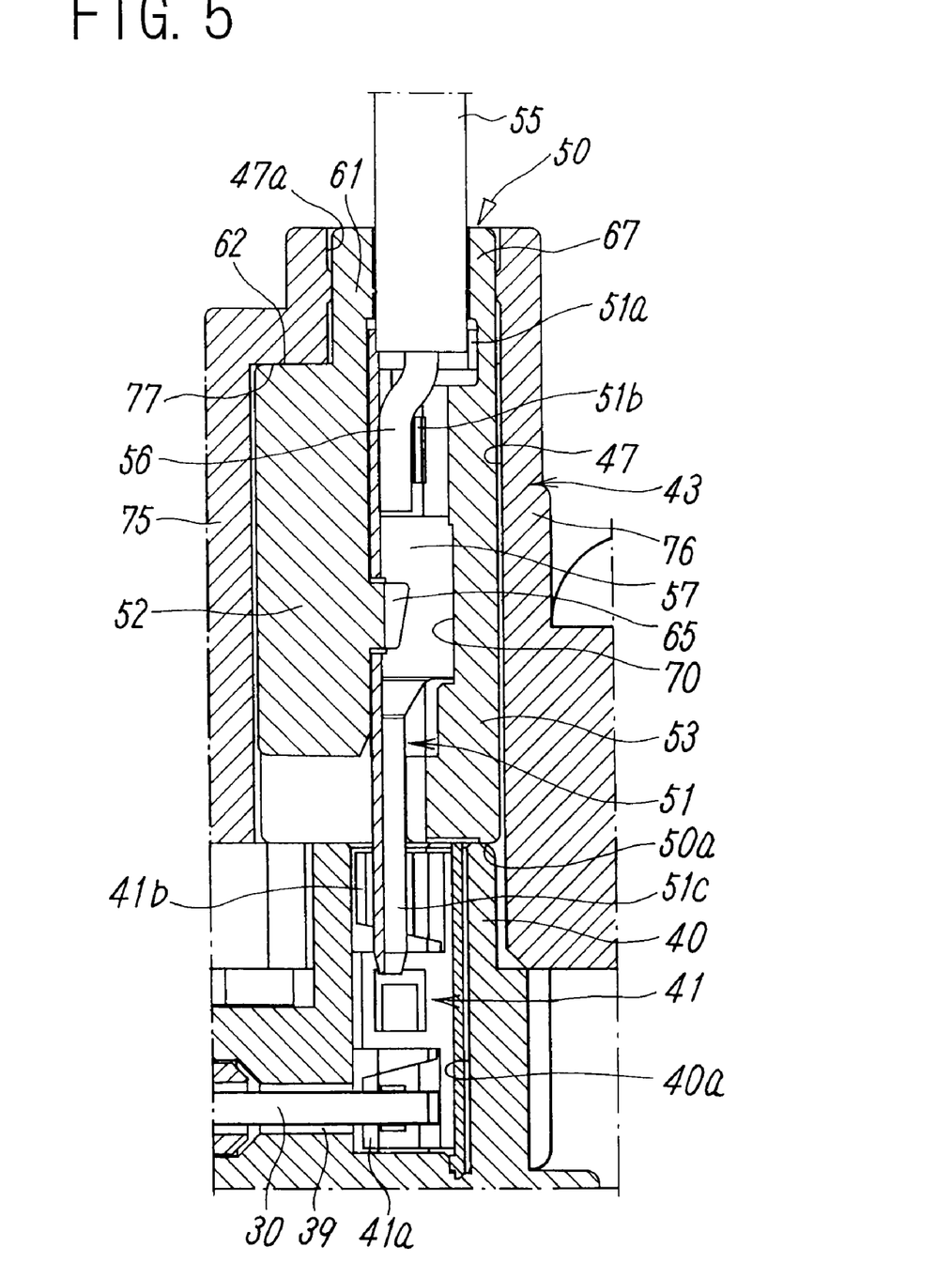
FIG. 5 is an enlarged sectional view of a portion of FIG. 1.
Figure 6:
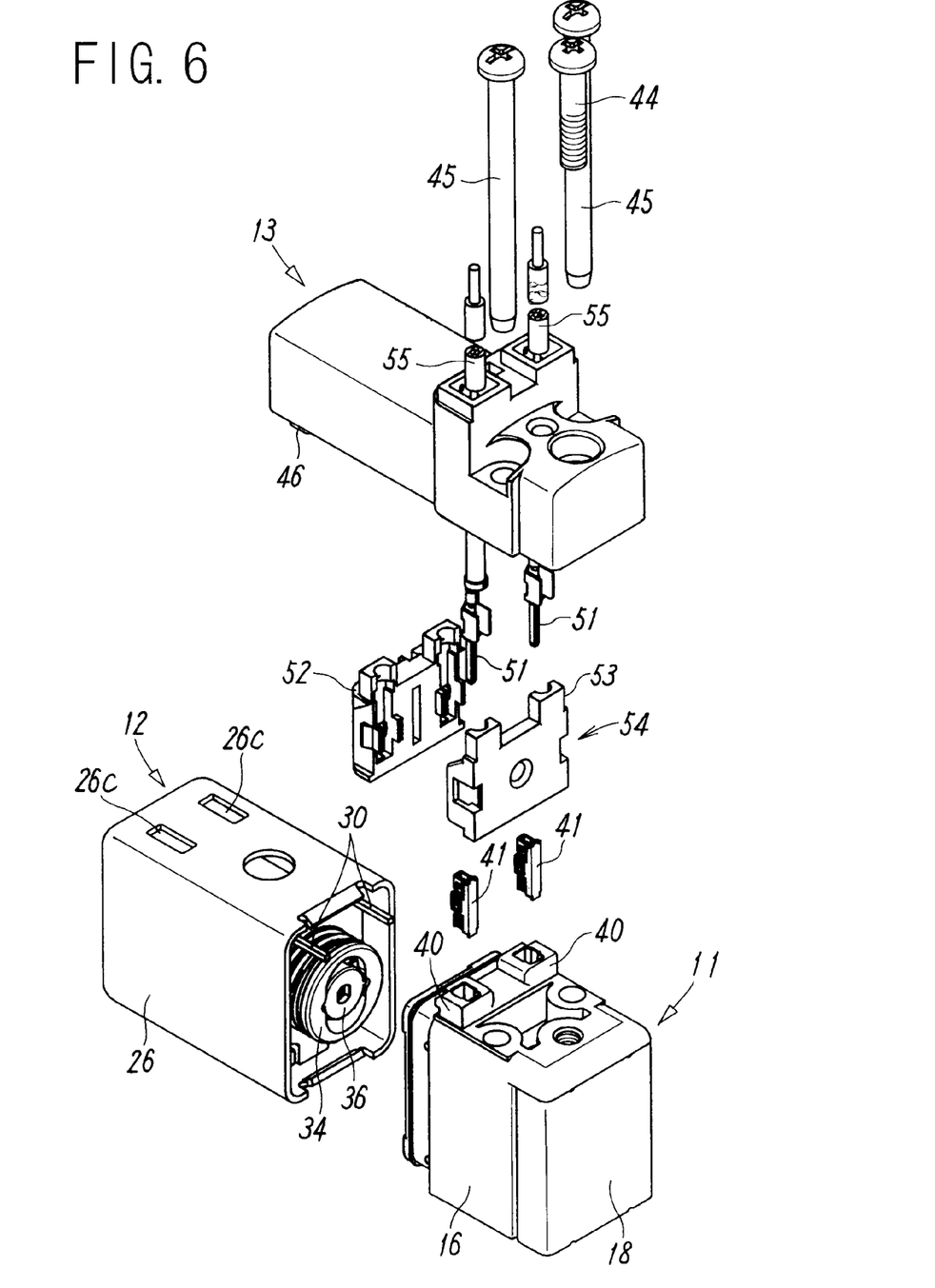

Two square, hollow socket housings 40 are formed adjacent to the solenoid operation section 12 on a second side surface 16b opposing the first side surface 16a having the ports P, A, and R of the valve body 16, the socket housing 40 protruding outward from the second side surface 16b so as to be integral with the valve body 16. The socket housings 40 formed at positions corresponding to the tips of the coil terminals 30 extending in parallel to the second side surface include two hollows 40a therein extending to coil terminals 30, each of the two hollows 40a having a socket 41 therein. As shown in FIG. 5, the socket 40 formed of resilient, conductive metal sheet by folding, is provided at one end thereof with a holder 41a to elastically hold the tip of the coil terminal 30 for electrical and mechanical connection between the coil terminal 30 and the socket 41. The socket 40 is further provided at the other end thereof with a holder 41b to elastically hold the tip of the power feeding terminal 51 inserted from the outside for electrical and mechanical connection between the power feeding terminal 51 and the socket 41.

Figure 7:
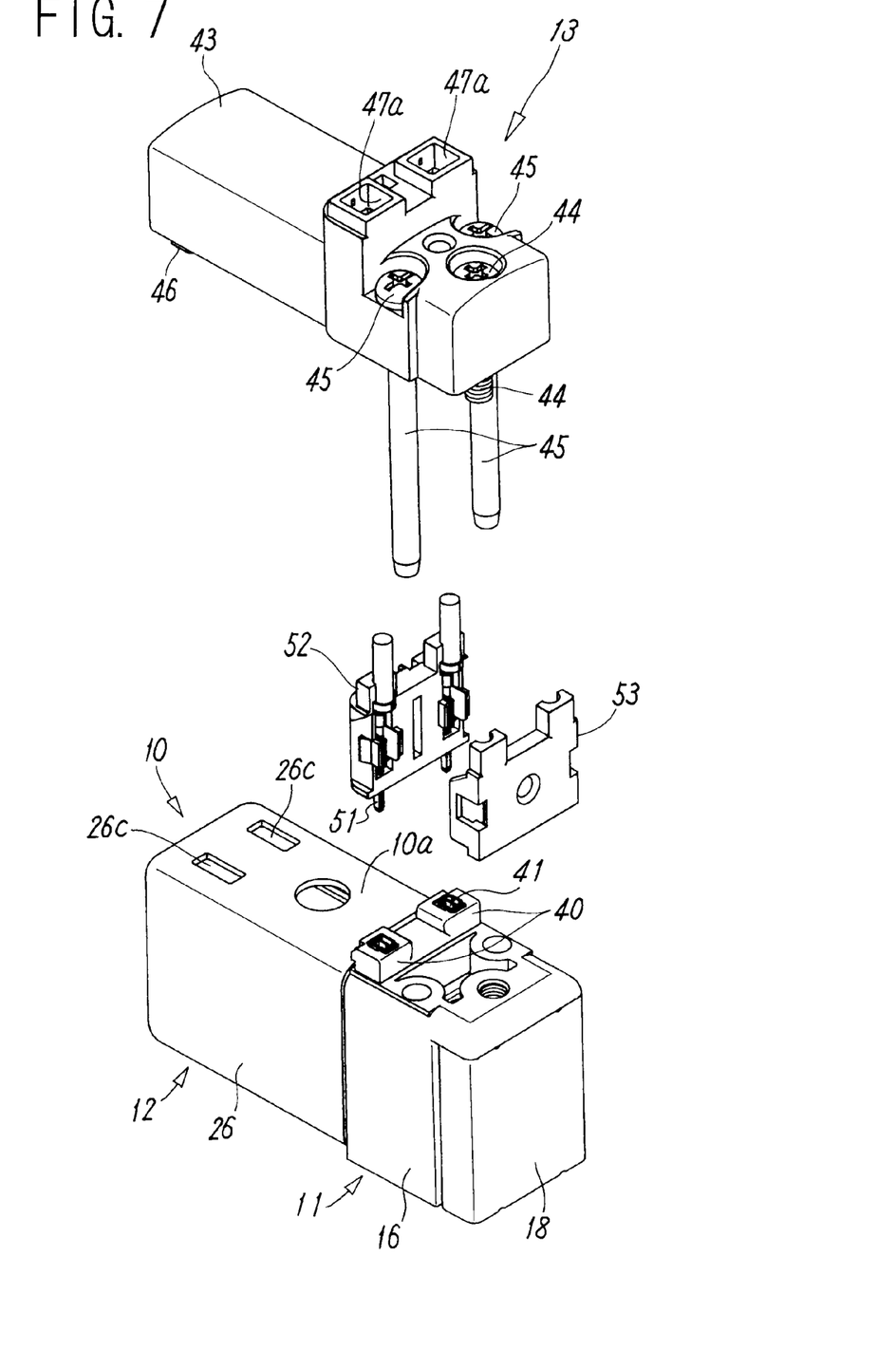
Figure 8:
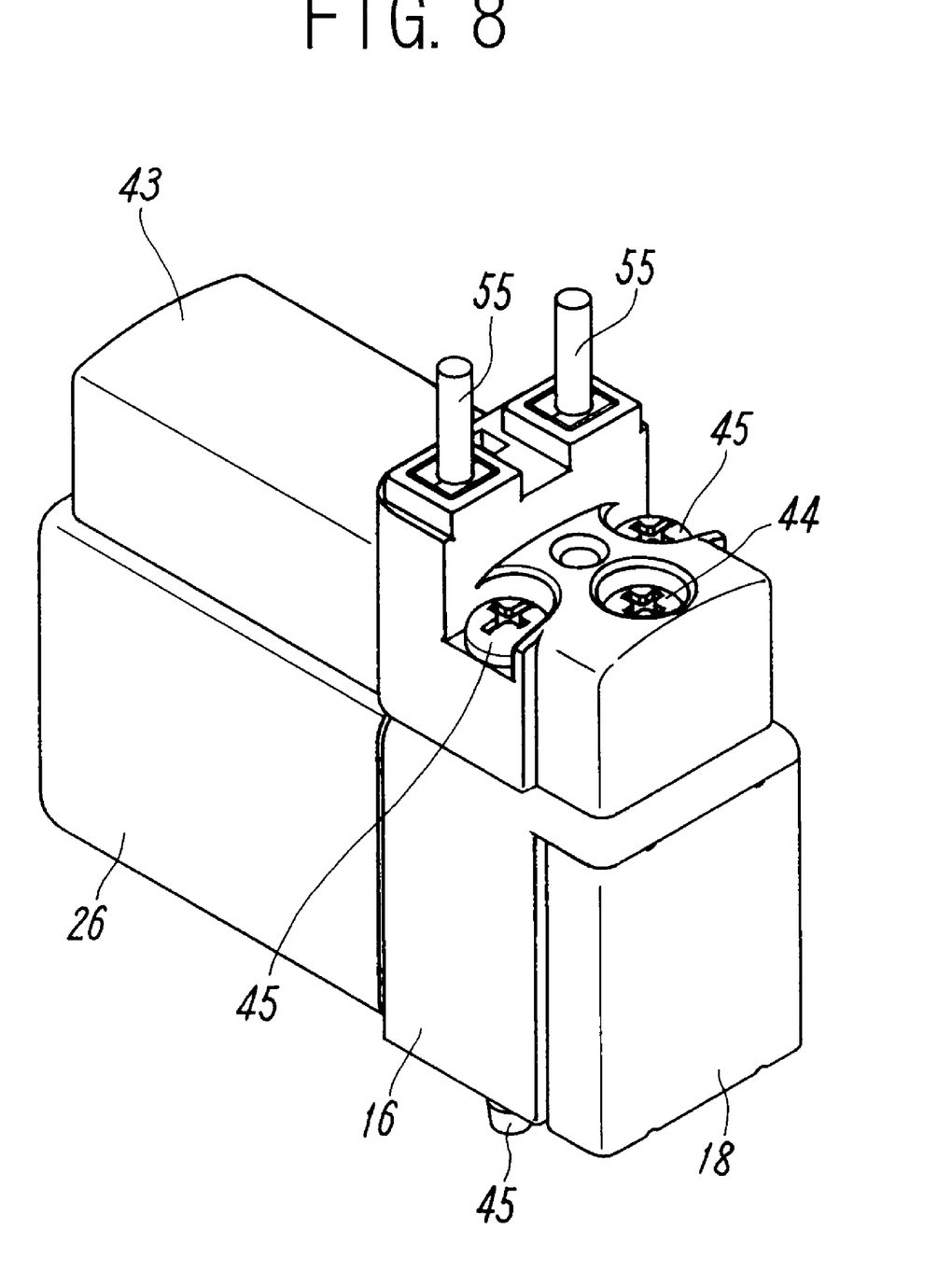
FIG. 8 is a perspective view showing the solenoid valve assembly in an assembled form.

The second side surface 16b of the valve body 16 and the side surface 12a of the solenoid operation section 12 are generally flat or form one substantially flat plane with no projections extending outward except for the socket housing 40, thereby forming a terminal cover mounting surface 10a on the side of the solenoid valve body 10. As shown in FIGS. 1 and 7, the terminal cover 43 which is sufficiently large to cover the passage switching section 11 and the solenoid operation section 12 is disposed on the terminal cover mounting surface 10a, the terminal cover 43 being mounted on the solenoid valve body 10 in a manner to be described later.

A terminal box housing 47 for housing the power feeding terminal box 50 is formed on the terminal cover 43 at a position thereon corresponding to the two socket housings 40 on the valve body 10. The terminal box housing 47 which is sufficiently spacious to house the two socket housings 40 communicates with the outside of the terminal cover 43 through two rectangular power feeding line insertion holes 47a. The terminal box housing 47 has a larger inner width along the lengthwise direction of the terminal box 43 than the width of the power feeding line insertion holes 47a, thereby forming at the upper end thereof the locking stopper 77 facing downward (inward) to which the power feeding terminal box 50 locks. Two power feeding terminals 51 supported by the power feeding terminal box 50 housed in the terminal box housing 47 are connected with the sockets 41.

As shown in FIGS. 1 and 7, the terminal cover 43 is provided at its end that is in contact with the solenoid valve body 10 with a pair of latch members 46 protruding toward the solenoid valve body 10. The latch members 46 are inserted into a pair of latch holes 26c formed on the magnet cover 26 of the solenoid valve body 10 so that the hooks 46a of the latch members 46 are locked into the latch holes 26c at their circumference. In addition, the terminal cover 43 is provided at the other end thereof with a through-hole into which a securing screw 44 is inserted and engaged with female threads formed on the valve body 16, thereby allowing the terminal cover 43 to be mounted on and secured to the solenoid valve body 10. Mounting screws 45 are inserted into two through-holes which are formed in each of the terminal cover 43 and the valve body 16, enabling the solenoid valve assembly to be secured to a manifold, and the like.

Figure 2:
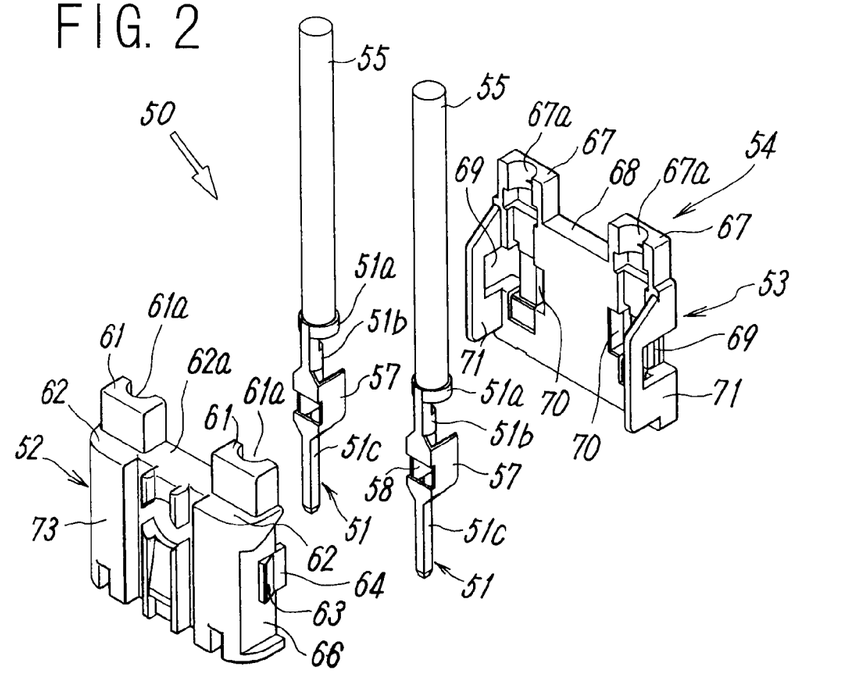
FIG. 2 is a disassembled perspective view of the power feeding terminal box in an embodiment of the present invention.
Figure 3:
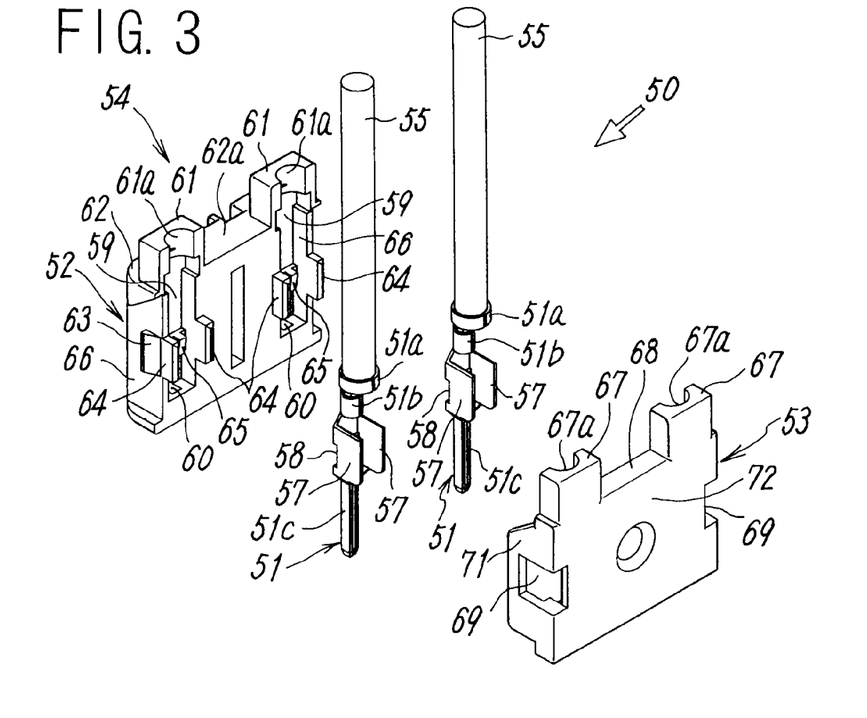
FIG. 3 is a disassembled perspective view of the power feeding terminal box, as viewed from a different angle, in an embodiment of the present invention.
Figure 4:
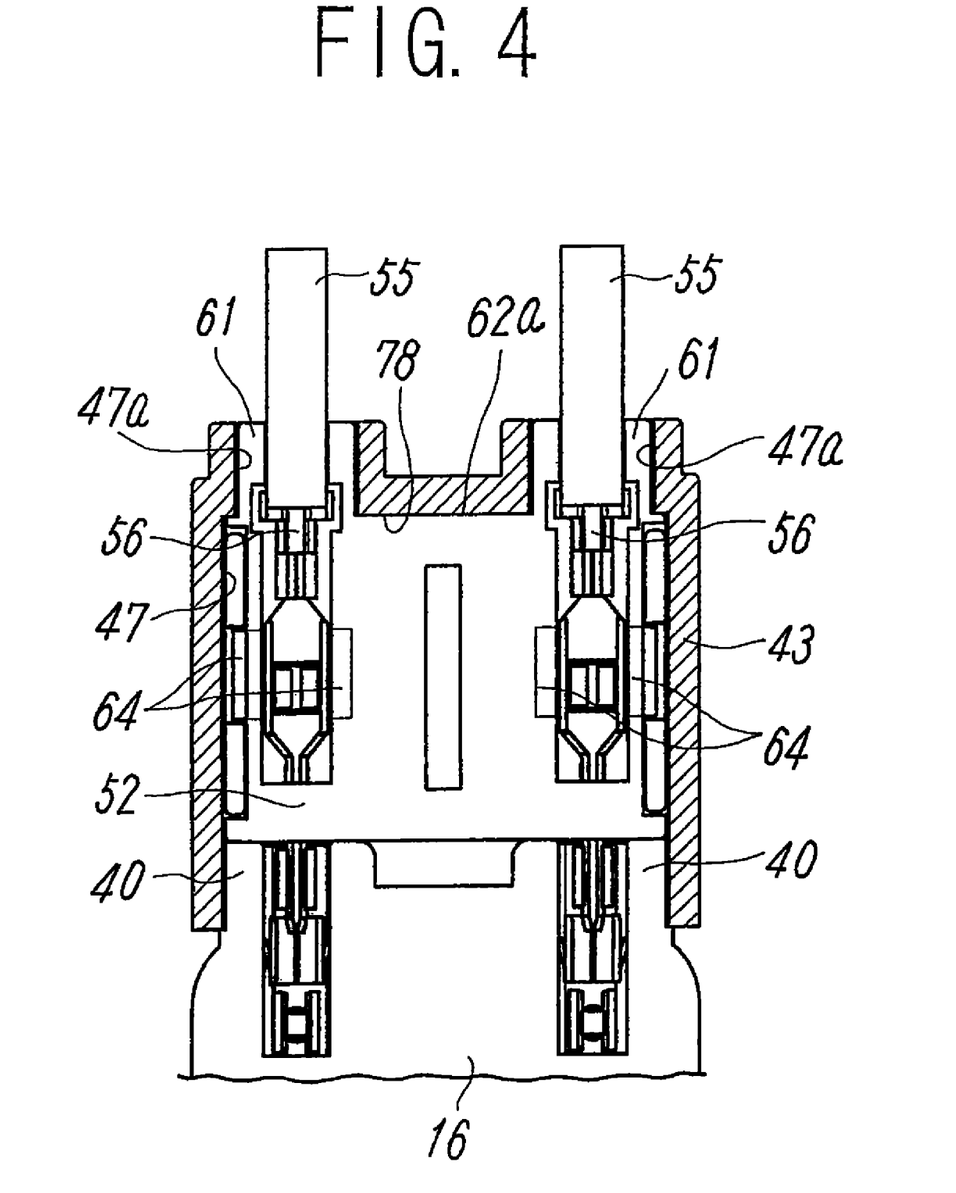
FIG. 4 is a front view of the power feeding terminal box wherein the feeding terminals are housed in the terminal housing box.

The power feeding terminal box 50 housed in the terminal box housing 47 is described below. As FIGS. 2 through 4 depict clearly, the power feeding terminal box 50 includes a separatable housing 54 having a rectangular terminal housing box 52 with an opening at one side surface and a cover 53 for covering the opening of the terminal housing box 52, and two power feeding terminals 51 housed in the housing 54 and connected to the power feeding lines 55. The power feeding line 55 is held at the insulation of the tip thereof by a holding arm 51a formed on the base end of the power feeding terminal 51. The conductive core wire 56 extending from the above insulation is held by a core wire holder 51b formed adjacent to the above holding arm 51a for electrical connection with the power feeding terminal 51.

The power feeding terminal 51 is formed by folding a conductive sheet metal, and the side thereof facing the terminal housing box 52 forms a plane. This plane has a wider section width at the intermediate portion thereof along the lengthwise direction of the power feeding terminal 51, and a narrower section at both ends thereof. Each of the holding arm 51a and the core wire holder 51b is formed by a pair of semicircular portions extending to the cover 53 from both side ends on a narrow plane section at the base end of the power feeding terminal 51. The wider section adjacent to the core wire holder 5b includes an engaging hole 58. The engaging hole 58 has two flat plate shaped supports 57 formed at the side ends thereof protruding generally in parallel toward the cover 53. In addition, the power feeding terminal 51 includes a pin shaped insert 51c formed at the tip thereof adjacent to the engaging hole 58, the insert being formed by folding the narrow section of the plane at both side ends toward the cover 53.

The terminal housing box 52 includes two concave terminal housing chambers 59 therein spaced apart from each other, the terminal housing chamber 59 having a terminal insertion hole 60 formed at the bottom thereof, the terminal housing chamber 59 further having the power feeding terminal 51 connected to the power feeding line 55 housed therein so that the power feeding terminal 51 is locked into the terminal insertion hole 60.

The terminal housings box 52 and the cover 53 includes guides 61 and 67, respectively, integrally formed at the top ends thereof opposed to each other, the guides 61 and 67 having semicircular grooves 61a and 67a therein with which the power feeding lines are engaged. The semicircular grooves 61a and 67a being opposed to each other hold the end of the power feeding line therebetween. These guides 61 and 67 engage with the power feeding line insertion hole 47a when the power feeding terminal box 50 is housed in the terminal box housing 47 of the terminal cover 43.

The terminal housing box 52 includes two lock projections 63, one projecting from one side end 66 thereof and the other projecting from the other side end 66 thereof. In contrast, the cover 53 includes two lock holes 69, one being formed in one side wall 71 thereof and the other in the other side wall 71 thereof, into which the lock projections 63 lock in a resilient manner. The lock projections 63 and the lock holes 69 form a locking mechanism for locking the terminal housing box 52 into the cover 53 in an assembled form.

In addition, the terminal housing box 52 includes an engaging projection 65 projecting from the center of the terminal housing chamber 59 for engaging with an engaging hole formed on the power feeding terminal 51 such that the power feeding terminal 51 is held in place. The terminal housing chamber 59 is provided adjacent to both front sides thereof with a pair of projections 64 projecting so as to be in contact with the outer side surfaces of a pair of the supports 57 of the power feeding terminal 51. The cover 53 includes a recess 70 formed thereinside for supporting a pair of the supports 57 of the power feeding terminal 51.

To build into the housing 54 two power feeding terminals 51, each being connected to the power feeding line, first, the insert 51c of the power feeding terminal 51 is inserted into the terminal insertion hole 60 of the terminal housing chamber 59 in the terminal housing box 52 so that the tip of the insert 51c protrudes to the outside. The engaging hole 58 of the power feeding terminal 51 is engaged with the engaging projection 65, and a pair of the supports 57 is brought into contact at the outer side surface thereof with the inner faces of a pair of the projections 64. The power feeding line 55 is made engaged with the semicircular groove 61a.

Then, the sides 66 and the projections 64 of the terminal housing box 52 are mated at their outer faces with the inner sides of the side walls 71 of the cover 53 before the cover 53 is strongly inserted into the terminal housing box 52. During the insertion, the side walls 71 of the cover 53 and the sides 66 of the terminal housing box 52 are deformed in a resilient manner, causing the lock projections 63 of the terminal housing box 52 to be in sliding-contact with the inner surface of the side walls 71, so that two lock projections 63 are locked into two lock holes 69, and at the same time a pair of supports 57 on the power feeding terminal 51 are inserted at the tips thereof into the recess 70 inside the cover 53. This completes the assembly of the power feeding terminal box 50 to be housed in the terminal box housing 47 inside the terminal cover 43, wherein the terminal housing box 52 and the cover 53 have the power feeding lines 55 coupled with the power feeding terminals 51 held therebetween.

The lock projection 63 may formed on the side walls of the cover 53, and the lock holes 69 may be formed on the sides 66 of the terminal housing box 52.

Then, the power feeding terminal box 50 is installed into the terminal box housing 47 in the terminal cover 43, which is mounted on the solenoid valve body according to the procedures below.

To install the power feeding terminal box 50 into the terminal box housing 47 in the terminal cover 43, after the power feeding line 55 is put into the terminal cover 43 from the bottom so as to go through the power feeding line insertion hole 47a to the outside, the power feeding terminal box 50 is so oriented that a back side 73 of the terminal housing box 52 is opposed to a first apertured wall 75 of the terminal box housing 47 and that the back side 72 of the cover 53 is oppose to the second apertured wall 76 of the terminal box housing 47, as shown in FIGS. 2 through 6. Then, the power feeding terminal box 50 is housed and mounted in the terminal box housing 47 of the cover 43 with the guides 61 and 67 being engaged with the power feeding insertion holes 47a.

This causes the terminal cover support 62 formed on the terminal housing box 52 to be brought into contact with the locking stopper 77 formed at the upper end of the terminal box housing 47 and facing inward. This also causes the terminal cover support 62a formed between a pair of the guides 61 on the terminal housing box 52 and the terminal cover support 68 formed between a pair of the guides 67 on the cover 53 to be brought into contact with the locking stopper 78 inside the terminal cover 43, allowing the power feeding terminal box 50 to be held in place inside the terminal cover 43 and to be locked into the terminal box housing 47 when the terminal cover 43 is mounted on the solenoid valve body 10.

Installation of the cover 43 onto the solenoid valve body 10 is carried out with the latch member 46 and the securing screw 44, as described above. Installation of the terminal cover 43 with the power feeding terminal box 50 mounted thereinside onto the solenoid valve body 10 causes the power feeding terminals 51 inside the power feeding terminal box 50 to plug into the sockets 41 so as to provide an electrical connection between the power feeding terminals 51 and the coil terminals 30. This also causes the two socket housings 40 projecting from the solenoid valve body to be in close proximity to or in contact with the bottom 50a of the power feeding terminal box 50, resulting in the power feeding terminal box 50 being held between the socket housing 40 and the locking stoppers 77 and 78, thereby completing the solenoid valve assembly.

Although the ends of the power feeding terminals 51 protrude from the power feeding terminal box 50 before the terminal cover 43 with the power feeding terminal box 50 mounted is installed into the solenoid valve body 10, the completed solenoid valve assembly allows the ends of the power feeding terminals 51 to be housed inside the socket housing 40, thereby preventing detachment of the power feeding terminal box 50 from the terminal cover 43. This eliminates the risk of exposure of the power feeding terminals 51 to the outside, leading to enhanced safety.

The invention claimed is:

1. A solenoid valve assembly, comprising:
   a solenoid valve body having a passage switching section for switching a fluid passage and a solenoid operation section for operating the passage switching section; and
   a power feeding system for feeding the solenoid operation section of the solenoid valve body with power;
   wherein the solenoid valve body has a socket housing at a side surface of the passage switching section, and a socket electrically connected with a coil in the solenoid operation section is accommodated into the socket housing;
   wherein the power feeding system includes a terminal cover mounted on a side of the solenoid valve body so as to cover the passage switching section and the solenoid operation section, and a power feeding terminal box for holding a pin-shaped power feeding terminal connected with an end of a power feeding line extending into said power feeding terminal box by way of a power feed line insertion hole in the exterior of said terminal cover;
   wherein the terminal cover includes a terminal box housing for housing the power feeding terminal box at a position corresponding to the socket housing, and a locking stopper formed at a part of the terminal box housing and extending inwardly for locking the power feeding terminal box in said terminal cover; and
   wherein the power feeding terminal box has a terminal cover support positioned closer to said power feed line insertion hole than is said pin-shaped power feeding terminal when said pin-shaped power feeding terminal is held by said power feeding terminal box, for engaging with the locking stopper to lock the power feeding terminal box in said terminal cover, and after the power feeding terminal box is accommodated into the terminal box housing of the terminal cover from the solenoid valve body side, the terminal cover is mounted on the solenoid valve body, thereby the power feeding terminal electrically connects with the socket, and at the same time the terminal cover support is locked into the locking stopper and the power feeding terminal box is provided in the terminal box housing so as to not pull out.

2. A solenoid valve assembly according to claim 1, wherein the socket housing is formed so as to project from the side surface of the passage switching section and be adjacent to or in contact with the bottom of the power feeding terminal box, thereby the power feeding terminal box intervenes between the socket housing and the locking stopper.

3. A solenoid valve assembly according to claim 1, wherein the power feeding terminal box includes a rectangular-box-shaped terminal housing box which is open at one side thereof, and a cover for covering the open side of the terminal housing box, and wherein the terminal housing box and the cover are coupled with each other in a state that the end of the power feeding line and the power feeding terminal are intervened between the terminal housing box and the cover, thereby the power feeding terminal box and the power feeding terminal are integrally assembled.

4. A solenoid valve assembly according to claim 2, wherein the power feeding terminal box includes a rectangular-box-shaped terminal housing box which is open at one side thereof, and a cover for covering the open side of the terminal housing box, and wherein the terminal housing box and the cover are coupled with each other in a state that the end of the power feeding line and the power feeding terminal are intervened between the terminal housing box and the cover, thereby the power feeding terminal box and the power feeding terminal are integrally assembled.

5. A solenoid valve assembly according to claim 3, wherein the terminal housing box and the cover are integrally coupled together by means of a lock projection formed on one counterpart and a lock hole formed on the other counterpart.

6. A solenoid valve assembly according to claim 4, wherein the terminal housing box and the cover are integrally coupled together by means of a lock projection formed on one counterpart and a lock hole formed on the other counterpart.

7. A solenoid valve assembly according to claim 5, wherein the cover has elastically deformable side walls at both side ends thereof, and a plurality of lock holes formed at the side walls, and wherein the terminal housing box is inserted between the side walls in a resilient manner so that a plurality of the lock projections formed at both sides of the terminal housing box are locked into the lock holes.

8. A solenoid valve assembly according to claim 6, wherein the cover has elastically deformable side walls at both side ends thereof, and a plurality of lock holes formed at the side walls, and wherein the terminal housing box is inserted between the side walls in a resilient manner so that a plurality of the lock projections formed at both sides of the terminal housing box are locked into the lock holes.

9. A solenoid valve assembly according to claim 3, wherein the terminal housing box includes a concave-shaped terminal housing chamber for housing the power feeding terminal, the terminal housing chamber having an engaging projection at the center thereof, and wherein the power feeding terminal includes an engaging hole at a longitudinally intermediate position thereof, and the power feeding terminal is located inside the terminal housing box by engaging the engaging projection with the engaging hole.

10. A solenoid valve assembly according to claim 4, wherein the terminal housing box includes a concave-shaped terminal housing chamber for housing the power feeding terminal, the terminal housing chamber having an engaging projection at the center thereof, and wherein the power feeding terminal includes an engaging hole at a longitudinally intermediate position thereof, and the power feeding terminal is located inside the terminal housing box by engaging the engaging projection with the engaging hole.

11. A solenoid valve assembly according to claim 5, wherein the terminal housing box includes a concave-shaped terminal housing chamber for housing the power feeding terminal, the terminal housing chamber having an engaging projection at the center thereof, and wherein the power feeding terminal includes an engaging hole at a longitudinally intermediate position thereof, and the power feeding terminal is located inside the terminal housing box by engaging the engaging projection with the engaging hole.

12. A solenoid valve assembly according to claim 6, wherein the terminal housing box includes a concave-shaped terminal housing chamber for housing the power feeding terminal, the terminal housing chamber having an engaging projection at the center thereof, and wherein the power feeding terminal includes an engaging hole at a longitudinally intermediate position thereof, and the power feeding terminal is located inside the terminal housing box by engaging the engaging projection with the engaging hole.

13. A solenoid valve assembly according to claim 7, wherein the terminal housing box includes a concave-shaped terminal housing chamber for housing the power feeding terminal, the terminal housing chamber having an engaging projection at the center thereof, and wherein the power feeding terminal includes an engaging hole at a longitudinally intermediate position thereof, and the power feeding terminal is located inside the terminal housing box by engaging the engaging projection with the engaging hole.

14. A solenoid valve assembly according to claim 8, wherein the terminal housing box includes a concave-shaped terminal housing chamber for housing the power feeding terminal, the terminal housing chamber having an engaging projection at the center thereof, and wherein the power feeding terminal includes an engaging hole at a longitudinally intermediate position thereof, and the power feeding terminal is located inside the terminal housing box by engaging the engaging projection with the engaging hole.

15. A solenoid valve assembly according to claim 1, wherein an end on the solenoid operation section side of the terminal cover is locked to the solenoid operation section by a latch member formed on the terminal cover and a latch hole formed on the solenoid valve body, and an end on the passage switching section side of the terminal cover is fixed to the solenoid valve body by a securing screw.

16. A solenoid valve assembly according to claim 2, wherein an end on the solenoid operation section side of the terminal cover is locked to the solenoid operation section by a latch member formed on the terminal cover and a latch hole formed on the solenoid valve body, and an end on the passage switching section side of the terminal cover is fixed to the solenoid valve body by a securing screw.

* * * * *